(12) United States Patent
Tai

(10) Patent No.: US 7,980,759 B2
(45) Date of Patent: Jul. 19, 2011

(54) TEMPERATURE SENSING CIRCUIT FOR LOW VOLTAGE OPERATION

(75) Inventor: Jy-Der David Tai, Sanchong (TW)

(73) Assignee: Tai-1 Microelectronics Corp., Sanchong (TW)

( * ) Notice: Subject to any disclaimer, the term of this patent is extended or adjusted under 35 U.S.C. 154(b) by 666 days.

(21) Appl. No.: 12/144,692

(22) Filed: Jun. 24, 2008

(65) Prior Publication Data

US 2009/0279584 A1   Nov. 12, 2009

(30) Foreign Application Priority Data

May 9, 2008   (TW) ............................. 97117096 A

(51) Int. Cl.
*G01K 7/01* (2006.01)
(52) U.S. Cl. ..................... 374/178; 327/512
(58) Field of Classification Search .............. 374/163, 374/178; 327/365, 512; 257/204
See application file for complete search history.

(56) References Cited

U.S. PATENT DOCUMENTS

| | | | | |
|---|---|---|---|---|
| 6,489,831 B1 * | 12/2002 | Matranga et al. | ............. | 327/512 |
| 7,230,472 B1 * | 6/2007 | Scheuerlein et al. | ......... | 327/512 |
| 7,417,487 B2 * | 8/2008 | Mori | ............................. | 327/512 |
| 2008/0291969 A1 * | 11/2008 | Chu | ............................. | 374/178 |
| 2010/0008398 A1 * | 1/2010 | Nojima | ........................ | 374/178 |
| 2010/0054302 A1 * | 3/2010 | Anzai | ........................... | 374/178 |
| 2011/0025666 A1 * | 2/2011 | Baek et al. | .................... | 374/163 |

* cited by examiner

*Primary Examiner* — Brad Bennett
(74) *Attorney, Agent, or Firm* — Ming Chow Sinorica, LLC

(57) ABSTRACT

The present invention discloses a temperature sensing circuit which is adaptive toward low voltage IC environment, it mainly comprises: a temperature sensing unit, a temperature threshold control unit and a transconductance amplifier. The temperature sensing unit includes a bipolar transistor and PMOS transistors, and senses temperature via detecting voltage. The temperature threshold control unit includes PMOS transistors and NMOS transistors, and makes an over-temperature alert signal persistently sent out until temperature is lowered to a specified value when the temperature sensing unit detects an over-temperature state. The transconductance amplifier includes PMOS transistors and NMOS transistors, and makes the temperature sensing circuit of the present invention adapt to a low voltage IC environment. Further, the circuit architecture of the present invention does not require any use of operational amplifier or band-gap voltage reference source. Therefore, the present invention can reduce the production and design cost.

24 Claims, 3 Drawing Sheets

TEMPERATURE SENSING CIRCUIT FOR LOW VOLTAGE OPERATION

BACKGROUND OF THE INVENTION

1. Field of the Invention

The present invention relates to a semiconductor IC, particularly to a temperature sensing circuit having a temperature range control unit.

2. Description of the Related Art

With new electronic products persistently emerging, more and more functions are integrated into a single product. For example, the digital camera and MP3 player are being integrated into a mobile phone or many multimedia devices are being integrated into a notebook computer. As a result, manufacturers need to incorporate more chips into a single electronic product to satisfy such functional integration. In addition, with the increasing of CPU clock frequency at the same time, more heat is generated within the electronic product. However, overheating of any electronic product may result in data loss, system instability, or even chip burnout. An external temperature sensing element not only increases the manufacture cost, it also can not measure the temperature of the chip precisely. Therefore, the common solution is to implement a temperature sensing circuit within IC, which has the advantages of small size, fast response, high accuracy, low power consumption and easy software control.

The temperature sensing circuit usually allows the user to preset a temperature range. Once the temperature range is exceeded, a procedure is executed to lower the temperature automatically, or IC operation is interrupted directly. The operation of the current IC temperature sensing circuit is mainly implemented by an internal current source and an analog/digital converter inside the IC. As the forward voltage drop in a semiconductor PN junction varies proportionally with the temperature, the IC temperature sensing circuit could use such characteristic to detect the temperature of the IC. However, almost all the current temperature sensing circuit needs an operational amplifier and a band-gap voltage reference source. Thus, the current temperature sensing circuit cannot apply to a low-voltage IC environment. Further, the current temperature sensing circuit itself lacks an intrinsic temperature threshold control function. The temperature sensing function and the temperature threshold control function are separately realized with independent circuits, which are cascaded afterward. Therefore, the conventional technology not only inconveniences designers, but also increases the cost of manufacturing.

In order to solve the abovementioned problems, the present invention proposes a temperature sensing circuit for low voltage operation, which contains a temperature threshold control unit that can persistently send out an over-temperature alert until the temperature is lowered to a specified value, the present invention also lower the production cost since it does not require the use the operational amplifier and the band-gap voltage reference source.

SUMMARY OF THE INVENTION

The primary objective of the present invention is to provide a temperature sensing circuit which is mainly comprised by a temperature sensing unit, a temperature threshold control unit and a transconductance amplifier, wherein the temperature threshold control unit directly controls the state of the temperature sensing unit. The present invention not only can precisely detect temperature of the IC but also can persistently send out an over-temperature alert until the temperature is lowered to a specified value. Further, the transconductance amplifier makes the present invention able to operate under low supply voltage.

The temperature sensing unit senses temperature by detecting voltage. The temperature sensing unit comprises: a first PMOS transistor with its gate and drain coupled to a current output terminal and source coupled to a Vdd voltage; a second PMOS transistor with its gate also coupled to the current output terminal and source also coupled to the Vdd voltage; a third PMOS transistor with its gate also coupled to the current output terminal, source also coupled to the Vdd voltage and drain coupled to a resistor, wherein the other end of the resistor is grounded; and a PNP bipolar transistor with its emitter coupled to the drain of the second PMOS transistor and both of its base and collector are grounded. The temperature threshold control unit makes an over-temperature alert signal persistently sent out until the temperature is lowered to a specified value when the temperature sensing unit detects an over-temperature state. The temperature threshold control unit comprises: a fourth PMOS transistor with its gate coupled to the current output terminal and source coupled to the Vdd voltage; a first NMOS transistor with its gate and drain joined together and then connected to the drain of the fourth PMOS transistor and its source is grounded; a second NMOS transistor with its gate coupled to the gate of the first NMOS transistor and its source grounded; and a third NMOS transistor with its drain coupled to the emitter of the PNP bipolar transistor and source coupled to the drain of the second NMOS transistor. The transconductance amplifier has a voltage-comparison function and makes the whole temperature sensing circuit able to operate under a low voltage IC environment. The transconductance amplifier comprises: a fifth PMOS transistor with its source coupled to the Vdd voltage and gate coupled to the current output terminal; a sixth PMOS transistor with source also coupled to the Vdd voltage, gate also coupled to the current output terminal and drain outputting an alert signal; a seventh PMOS transistor with its source coupled to the drain of the fifth PMOS transistor and gate coupled to the drain of the third PMOS transistor; an eighth PMOS transistor with its source coupled to the source of the seventh PMOS transistor and gate coupled to the emitter of the PNP bipolar transistor; a fourth NMOS transistor with its drain and gate joined together and then connected to the drain of the seventh PMOS transistor and its source is grounded; a fifth NMOS transistor with its drain coupled to the drain of the eighth PMOS transistor, gate coupled to the gate of the fourth NMOS transistor and the source is also grounded; a sixth NMOS transistor with its drain coupled to the alert signal, gate coupled to the drain of the fifth NMOS transistor and the source is grounded; and an inverter with its input terminal coupled to the alert signal and output terminal coupled to the gate of the third NMOS transistor.

Below, the embodiments of the present invention are described in detail in cooperation with the attached drawings to make easily understood the objectives, technical contents, characteristics and accomplishments of the present invention.

DETAILED DESCRIPTION OF THE INVENTION

Figure 1:
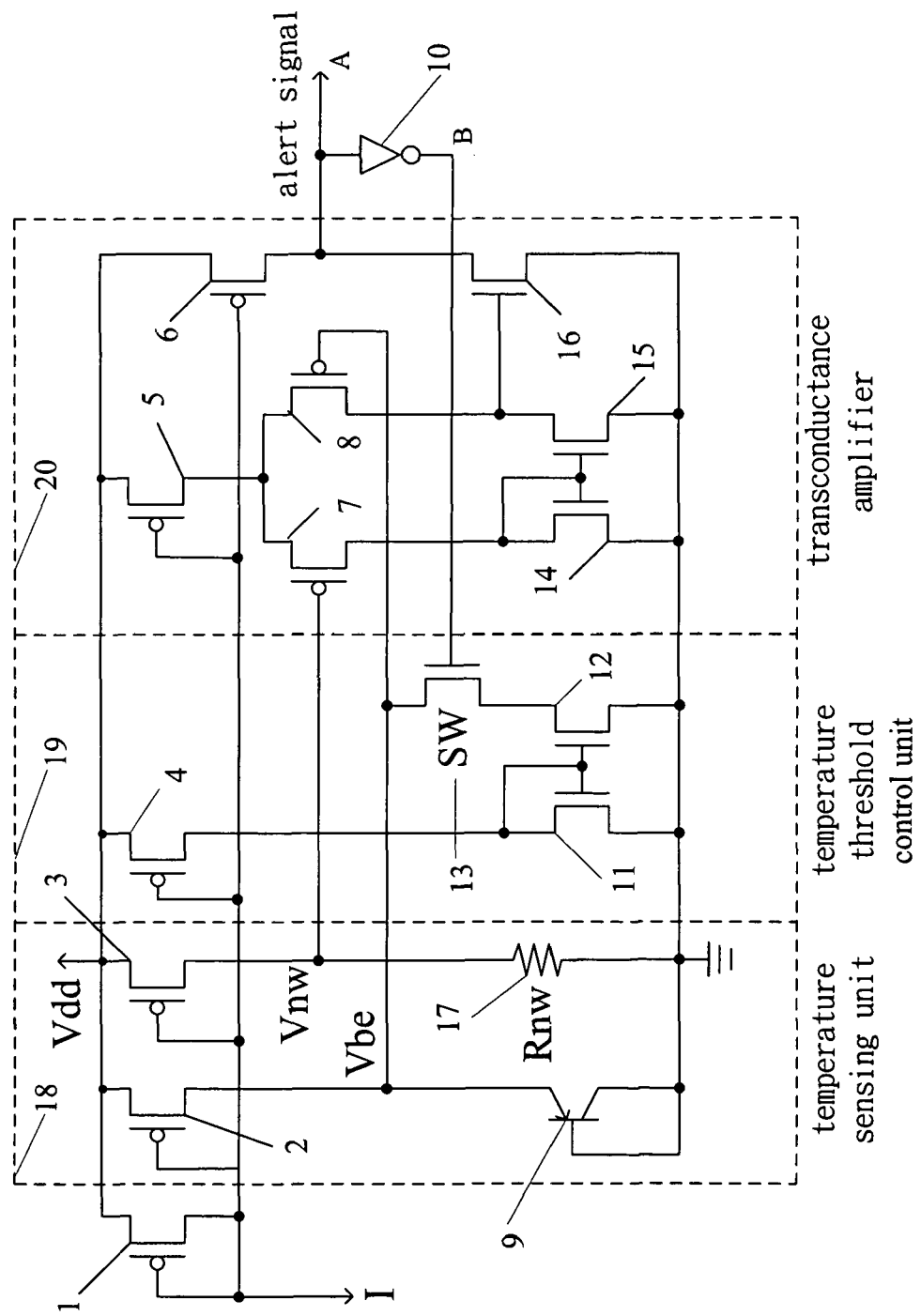
FIG. 1 is a diagram schematically showing the circuit according to the present invention.
Figure 2:
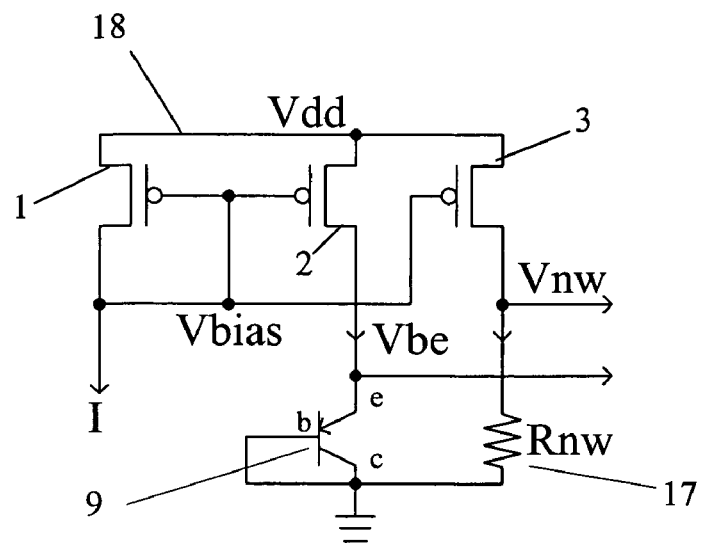
FIG. 2 is a diagram schematically showing the circuit of a temperature sensing unit according to the present invention.

The present invention discloses a temperature sensing circuit which is able to operate under a low voltage IC environment. Not only can the present invention detect the temperature of circuits, but it can also send out an over-temperature alert persistently until the temperature is lowered to a specified value. Refer to FIG. 1 a diagram schematically showing the circuit of a preferred embodiment of the present invention. The circuit of the present invention comprises: a temperature sensing unit 18, a temperature threshold control unit 19 and a transconductance amplifier 20. Refer to FIG. 2. The temperature sensing unit 18 senses temperature via detecting voltage. The temperature sensing unit further comprises the following elements: a PMOS transistor 1 with the gate and drain thereof coupled to a current output terminal and the source thereof coupled to a Vdd voltage; a PMOS transistor 2 with the gate thereof also coupled to the current output terminal and the source thereof also coupled to the Vdd voltage; a PMOS transistor 3 with the gate thereof also coupled to the current output terminal, the source thereof also coupled to the Vdd voltage and the drain thereof coupled to a resistor 17 (Rnw), wherein the other end of the resistor 17 is grounded; and a PNP bipolar transistor 9 with the emitter thereof coupled to the drain of the PMOS transistor 2 and both the base and collector thereof grounded.

The temperature threshold control unit 19 makes an over-temperature alert signal persistently sent out until the temperature is lowered to a specified value when the temperature sensing unit 18 detects an over-temperature state. The temperature threshold control unit 19 further comprises the following elements: a PMOS transistor 4 with the gate thereof coupled to the current output terminal and the source thereof coupled to the Vdd voltage; a NMOS transistor 11 with the gate and drain thereof joined together and then connected to the drain of the PMOS transistor 4 and the source thereof grounded; a NMOS transistor 12 with the gate thereof coupled to the gate of the NMOS transistor 11 and the source thereof grounded; and a NMOS transistor 13 with the drain thereof coupled to the emitter of the PNP bipolar transistor 9 and the source thereof coupled to the drain of the NMOS transistor 12.

Figure 3:
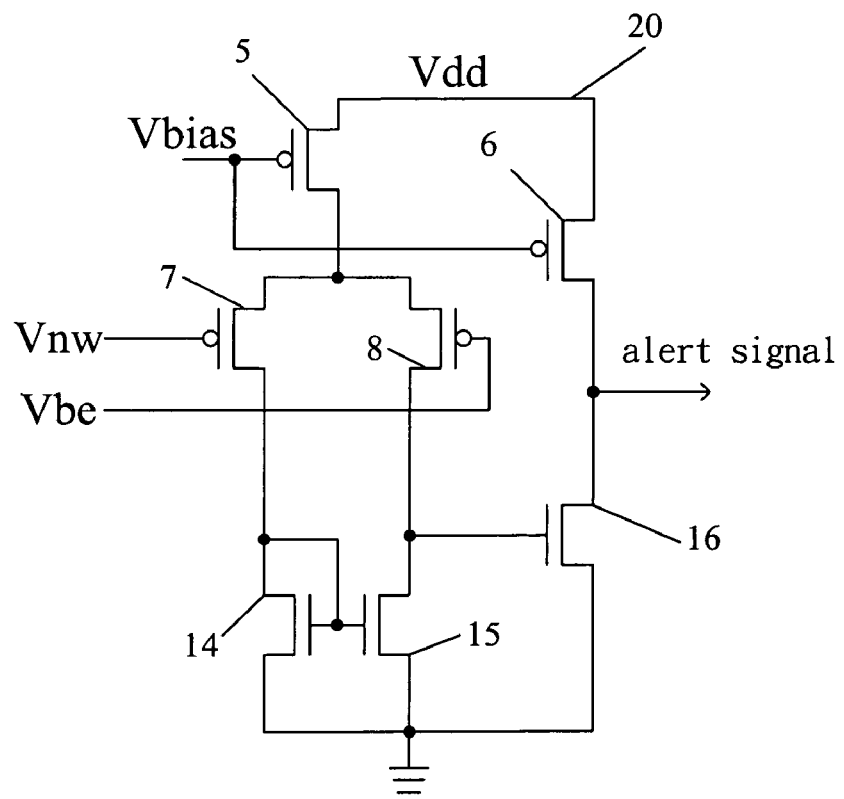
FIG. 3 is a diagram schematically showing the circuit of a transconductance amplifier according to the present invention.

The transconductance amplifier 20 has a voltage-comparison function and makes the whole temperature sensing circuit apply to a very low voltage IC environment. Therefore, the transconductance amplifier 20 is distinct from a conventional comparator. Refer to FIG. 3. The transconductance amplifier 20 further comprises the following elements: a PMOS transistor 5 with the source thereof coupled to the Vdd voltage and the gate thereof coupled to the current output terminal; a PMOS transistor 6 with the source thereof also coupled to the Vdd voltage, the gate thereof also coupled to the current output terminal and the drain thereof outputting an alert signal; a PMOS transistor 7 with the source thereof coupled to the drain of the PMOS transistor 5 and the gate thereof coupled to the drain of the PMOS transistor 3; a PMOS transistor 8 with the source thereof coupled to the source of the PMOS transistor 7 and the gate thereof coupled to the emitter of the PNP bipolar transistor 9; a NMOS transistor 14 with the drain and gate thereof joined together and then connected to the drain of the PMOS transistor 7 and the source thereof grounded; a NMOS transistor 15 with the drain thereof coupled to the drain of the PMOS transistor 8, the gate thereof coupled to the gate of the NMOS transistor 14 and the source thereof grounded; a NMOS transistor 16 with the drain thereof coupled to the alert signal, the gate thereof coupled to the drain of the NMOS transistor 15 and the source thereof also grounded; and an inverter 10 with the input terminal thereof coupled to the alert signal and the output terminal thereof coupled to the gate of the NMOS transistor 13.

Refer to FIG. 2 again. Vbe is the emitter voltage of the PNP bipolar transistor 9, and variation of Vbe with respect to temperature $$\left(\frac{\partial Vbe}{\partial T}\right)$$

can be expressed via Equation 1:

$$\frac{\partial Vbe}{\partial T} = \frac{Vbe - (4+m)V_t - Eg/q}{T} \tag{1}$$

With the above equation, it can be seen that $$\frac{\partial Vbe}{\partial T}$$

is about −2 mv/° C. when the temperature range is between −20° C. and 180° C.

Rnw is a N-well resister which has a positive temperature coefficient. The relationship of Rnw and temperature can be expressed by Equation 2:

$$Rnw = Rnw(27° C.)[1 + t_{C1}(T-27° C.) + t_{C2}(T-27° C.)^2] \tag{2}$$

wherein $t_{C1}$ is about 5 m and $t_{C2}$ is about 15μ.

$$As\ Vnw = I \times Rnw = I \times Rnw(27° C.)[1 + t_{C1}(T-27° C.) + t_{C2}(T-27° C.)^2], \tag{3}$$

differentiating both sides of Equation 3 will generate Equation 4:

$$\frac{\partial Vnw}{\partial T} = I \times Rnw(27° C.)[t_{C1} + 2t_{C2}\Delta T] \tag{4}$$

where $\Delta T = T - 27°$ C.

If the protection temperature is set to be 150° C., the calculation of $$\frac{\partial Vnw}{\partial T}$$

is about 2 mv/° C. Since $$\frac{\partial Vbe}{\partial T} = -2\text{mv}/° C.\ \text{and}\ \frac{\partial Vnw}{\partial T} = 2\text{mv}/° C.,$$

the result gives us that $$\frac{\partial Vnw}{\partial T} - \frac{\partial Vbe}{\partial T} = 4\text{mv}/° C.$$

Therefore, the variation of voltage with respect to temperature is about 4 mv/° C., a voltage that can be easily detected by a general amplifier. In additions, it also allows the temperature sensing unit 18 to operate under a very low voltage (about 1.2 v) environment.

If an appropriate Rnw is used at a lower temperature, Vbe will be higher than Vnw, and the output of the transconductance amplifier 20 is at a high voltage state. At this time, the output of the inverter 10 is at a low voltage state, and the NMOS transistor 13 is turned off. When the temperature rises, Vbe will decrease at a rate of 2 mv/° C., and Vnw will increase at a rate of 2 mv/° C. In a preferred embodiment of the present invention, suppose the alert temperature is set to be 150° C. When the temperature exceeds 150° C., Vbe is equal to or smaller than Vnw. At this time, the output of the transconductance amplifier 20 switches to a low voltage level, and the inverter 10 turns on the NMOS transistor 13, which functions as a switch. The PMOS transistor 4 provides a current mirror for the NMOS transistor 12 via the NMOS transistor 11. The current flows through the switch NMOS transistor 13 and shares with the bipolar transistor 9 a portion of the current provided by the PMOS transistor 2. Thus, when the alert signal shifts from a high voltage state to a low voltage state, Vbe will abruptly descend to a lower voltage, which enhances the turn-on state of the PMOS transistor 8. Thereby, the turn-on state of the NMOS transistor 16 is enhanced to maintain a low-voltage alert signal, and the output of the transconductance amplifier is maintained at a low voltage. Since the Vbe voltage is an antilog function of collector current, the Vbe voltage of the bipolar transistor 9 does not change too much even when the current shared by the NMOS transistor 12 varies. Such a characteristic provides a stable voltage drop Vbe in different values of the shared current of the NMOS transistor 12 under different supply voltages. When the temperature gradually decreases, Vnw will descend at a rate of 2 mv/° C., and Vbe will increase at a rate of 2 mv/° C. As the current is shared by NMOS transistor 12, Vbe will rise from a lower voltage. The temperature has to decrease to a specified value to offset the voltage drop caused by current sharing.

When the temperature decreases to a specified value, Vbe is equal to or greater than Vnw, and the output of the transconductance amplifier 20 shifts to a high voltage level. At this time, the NMOS transistor 13 will be turned off by the inverter 10. Once the NMOS 13 is turned off, the NMOS transistor 12 no longer shares current with bipolar transistor 9. Then, Vbe will increase abruptly by a value about equal to the value by which it decreased before. Therefore, if the temperature rises again, the voltage variation has to overcome the abrupt rise of Vbe. Such a process forms a temperature threshold control mechanism in the temperature sensing circuit.

Figure 4:
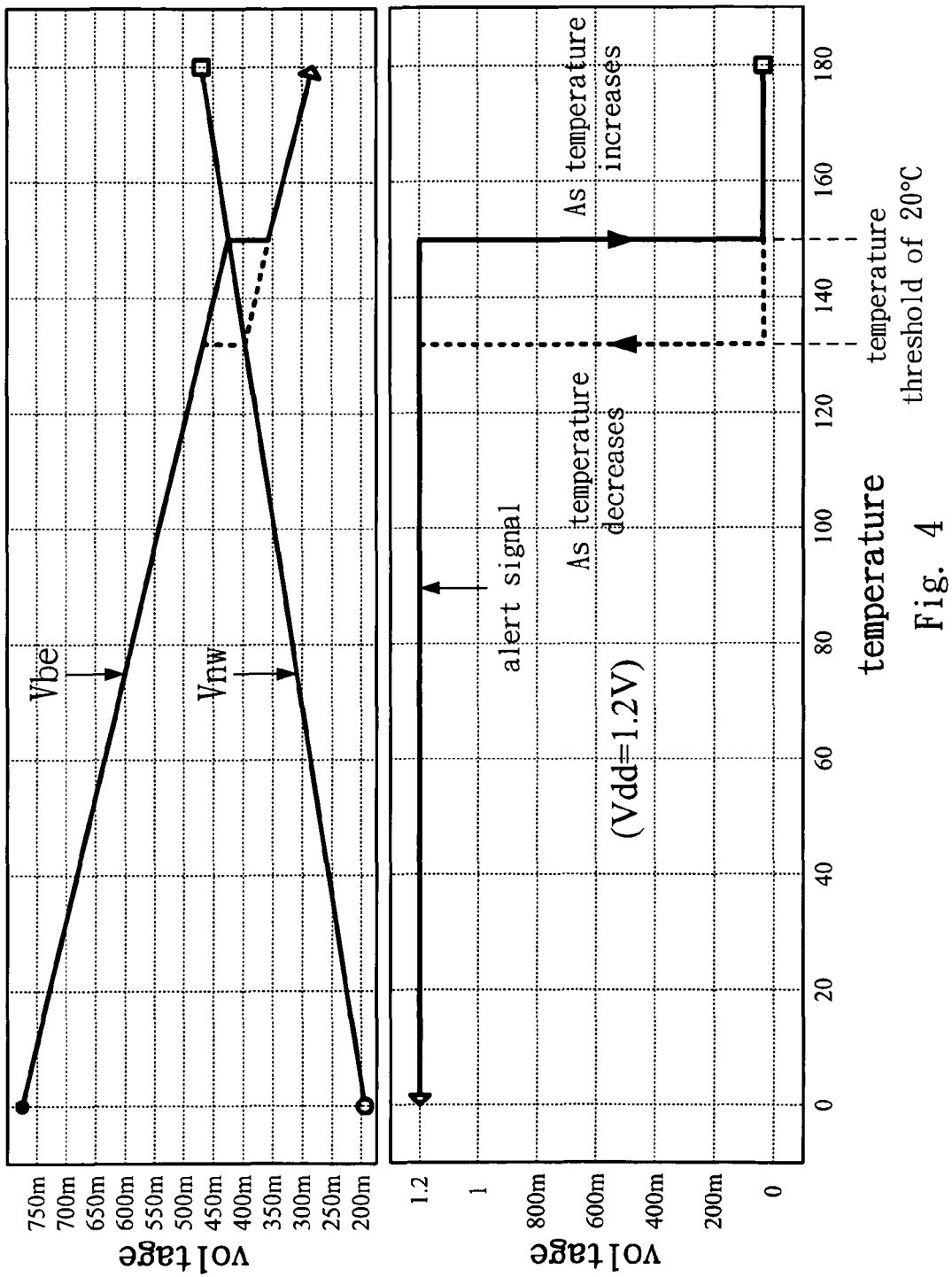
FIG. 4 is a diagram showing the simulation results of the present invention.

Refer to FIG. 4 for the simulation results of the present invention, wherein the line having a slope of −2 mv/° C. represents Vbe, and the line having a slope of 2 mv/° C. represents Vnw. Vbe has a voltage jump of about 75 mv; the range of temperature control is about 20° C., and the alert signal is triggered at 150° C. It can be observed in FIG. 4 that Vbe is greater than Vnw at the lower temperatures. When the temperature rises, Vbe decreases and Vnw increases continuously. On reaching 150° C., Vbe becomes equal to or smaller than Vnw. At this time, the alert signal shifts from a high voltage level to a low voltage level. The inverter 10 then turns on the NMOS transistor 13, and the NMOS transistor 12 shares the current originally flowing through the bipolar transistor 9, and thus Vbe abruptly descends. When the temperature lowers, Vnw decreases at a given rate, and Vbe increases at the same rate. As there is current sharing, the temperature has to descend to a specified value to offset the voltage drop caused by current sharing when Vbe rises from a lower voltage. When the temperature descends to a specified value, such as 130° C., Vbe becomes equal to or greater than Vnw, and the alert signal shifts from a low voltage level to a high voltage level. The inverter 10 then turns off the NMOS transistor 13, and the NMOS transistor 12 no longer shares current with the bipolar transistor 9. Thus, Vbe abruptly increases at 130° C. Refer to FIG. 1 again. When the temperature does not exceed 150° C., there is no alert signal. Therefore, node A is at a high voltage level, and node B is at a low voltage level, and the NMOS transistor 13 is turned off. When the temperature exceeds 150° C., the alert signal makes node A shift to a low voltage level and makes node B shift to a high voltage level. At the same time, the NMOS transistor 13 is turned on to share the current flowing through the bipolar transistor 9.

The preferred embodiments described above are only to exemplify the present invention but not to limit the scope of the present invention. Therefore, any equivalent modification or variation according to the shapes, structures, characteristics or spirit of the present invention is to be also included within the scope of the present invention.

What is claimed is:

1. A temperature sensing circuit, comprising:
 a temperature sensing unit, including a plurality of PMOS transistors and a PNP bipolar transistor, coupled to a current output terminal of a detected circuit and a Vdd voltage, and sensing temperature via detecting voltage;
 a temperature threshold control unit, including at least one PMOS transistor and a plurality of NMOS transistors, and making an over-temperature alert signal sent out until temperature is lowered to a specified value when said temperature sensing unit detects an over-temperature state; and
 a transconductance amplifier, including an inverter and a plurality of PMOS transistors and NMOS transistors, having a voltage-comparison function and making said temperature sensing circuit apply to a low voltage IC environment.

2. The temperature sensing circuit according to claim 1, wherein said temperature sensing unit includes: a first PMOS transistor, a second PMOS transistor, a third PMOS transistor, a positive temperature coefficient resistor and a PNP bipolar transistor.

3. The temperature sensing circuit according to claim 2, wherein gate and drain of said first PMOS transistor are coupled to said current output terminal, and source of said first PMOS transistor is coupled to said Vdd voltage.

4. The temperature sensing circuit according to claim 2, wherein gate of said second PMOS transistor is coupled to said current output terminal, and source of said second PMOS transistor is coupled to said Vdd voltage.

5. The temperature sensing circuit according to claim 2, wherein gate of said third PMOS transistor is coupled to said current output terminal, and source of said third PMOS transistor is coupled to said Vdd voltage, and drain of said third PMOS transistor is grounded via said positive temperature coefficient resistor.

6. The temperature sensing circuit according to claim 2, wherein emitter of said PNP bipolar transistor is coupled to drain of said second PMOS transistor, and a base and a collector of said PNP bipolar transistor are both grounded.

7. The temperature sensing circuit according to claim 1, wherein said temperature threshold control unit includes: a fourth PMOS transistor, a first NMOS transistor, a second NMOS transistor, and a third NMOS transistor.

8. The temperature sensing circuit according to claim 7, wherein gate of said fourth PMOS transistor is coupled to said current output terminal, and source of said fourth PMOS transistor is coupled to said Vdd voltage.

9. The temperature sensing circuit according to claim 7, wherein gate and drain of said first NMOS transistor are joined together and then connected to drain of said fourth PMOS transistor, and source of said first NMOS transistor is grounded.

10. The temperature sensing circuit according to claim 7, wherein gate of said second NMOS transistor is coupled to gate of said first NMOS transistor, and source of said second NMOS transistor is grounded.

11. The temperature sensing circuit according to claim 7, wherein drain of said third NMOS transistor is coupled to an emitter of said PNP bipolar transistor, and source of said third NMOS transistor is coupled to drain of said second NMOS transistor.

12. The temperature sensing circuit according to claim 1, wherein said transconductance amplifier includes: a fifth PMOS transistor, a sixth PMOS transistor, a seventh PMOS transistor, an eighth PMOS transistor, a fourth NMOS transistor, a fifth NMOS transistor, a sixth NMOS transistor, and an inverter.

13. The temperature sensing circuit according to claim 12, wherein gate of said fifth PMOS transistor is coupled to said current output terminal, and source of said fifth PMOS transistor is coupled to said Vdd voltage.

14. The temperature sensing circuit according to claim 12, wherein gate of said sixth PMOS transistor is coupled to said current output terminal, and source of said sixth PMOS transistor is coupled to said Vdd voltage, drain of said sixth PMOS transistor outputs said over-temperature alert signal.

15. The temperature sensing circuit according to claim 12, wherein source of said seventh PMOS transistor is coupled to drain of said fifth PMOS transistor, and gate of said seventh PMOS transistor is coupled to drain of said third PMOS transistor.

16. The temperature sensing circuit according to claim 12, wherein source of said eighth PMOS transistor is coupled to source of said seventh PMOS transistor, and gate of said eighth PMOS transistor is coupled to an emitter of said PNP bipolar transistor.

17. The temperature sensing circuit according to claim 12, wherein drain and gate of said fourth NMOS transistor are joined together and then connected to drain of said seventh PMOS transistor, and source of said seventh PMOS transistor is grounded.

18. The temperature sensing circuit according to claim 12, wherein drain of said fifth NMOS transistor is coupled to drain of said eighth PMOS transistor, and gate of said fifth NMOS transistor is coupled to gate of said fourth NMOS transistor, and source of said fifth NMOS transistor is grounded.

19. The temperature sensing circuit according to claim 12, wherein drain of said sixth NMOS transistor is coupled to said over-temperature alert signal, and gate of said sixth NMOS transistor is coupled to drain of said fifth NMOS transistor, and source of said sixth NMOS transistor is grounded.

20. The temperature sensing circuit according to claim 12, wherein an input terminal of said inverter is coupled to said over-temperature alert signal, and an output terminal of said inverter is coupled to gate of said third NMOS transistor.

21. The temperature sensing circuit according to claim 2, wherein an emitter of said PNP bipolar transistor receives a bipolar transistor emitter voltage (Vbe).

22. The temperature sensing circuit according to claim 7, wherein said fourth PMOS transistor supplies a current of a current mirror to said second NMOS transistor via said first NMOS transistor.

23. The temperature sensing circuit according to claim 7, wherein said third NMOS transistor functions as a switch controlling current mirror.

24. The temperature sensing circuit according to claim 7, wherein when said third NMOS transistor is turned on, said second NMOS transistor shares current with said PNP bipolar transistor; when said third NMOS transistor is turned off, said second NMOS transistor stops sharing current with said PNP bipolar transistor.

* * * * *